United States Patent
Gennaro et al.

(10) Patent No.: US 7,681,136 B2
(45) Date of Patent: Mar. 16, 2010

(54) METHODS AND SYSTEMS FOR COLLABORATIVE WHITEBOARDING AND CONTENT MANAGEMENT

(75) Inventors: Norman Gennaro, San Carlos, CA (US); Umesh Patel, Fremont, CA (US)

(73) Assignee: Oracle International Corporation, Redwood Sores, CA (US)

(*) Notice: Subject to any disclaimer, the term of this patent is extended or adjusted under 35 U.S.C. 154(b) by 769 days.

(21) Appl. No.: 10/755,195

(22) Filed: Jan. 8, 2004

(65) Prior Publication Data

US 2004/0158495 A1   Aug. 12, 2004

Related U.S. Application Data

(60) Provisional application No. 60/438,612, filed on Jan. 8, 2003.

(51) Int. Cl.
| | |
|---|---|
| G06F 17/00 | (2006.01) |
| G06F 3/00 | (2006.01) |
| G06F 3/048 | (2006.01) |
| G06F 15/16 | (2006.01) |
| G06Q 30/00 | (2006.01) |
| G06F 17/30 | (2006.01) |

(52) U.S. Cl. .................. 715/751; 715/211; 715/753; 715/769; 709/204; 705/26; 705/27; 705/400

(58) Field of Classification Search ................. 700/100; 715/511, 751, 753; 705/26, 27, 400; 709/204
See application file for complete search history.

(56) References Cited

U.S. PATENT DOCUMENTS

| | | | |
|---|---|---|---|
| 6,144,991 A | | 11/2000 | England |
| 6,212,534 B1 | | 4/2001 | Lo et al. |
| 6,298,356 B1 | * | 10/2001 | Jawahar et al. ............. 707/201 |
| 6,342,906 B1 | | 1/2002 | Kumar et al. |
| 6,351,777 B1 | * | 2/2002 | Simonoff .................... 709/250 |
| 6,360,250 B1 | * | 3/2002 | Anupam et al. ............. 709/204 |
| 6,463,460 B1 | * | 10/2002 | Simonoff .................... 709/203 |
| 6,567,813 B1 | * | 5/2003 | Zhu et al. ................... 707/100 |
| 6,598,074 B1 | * | 7/2003 | Moller et al. ............... 709/204 |

(Continued)

OTHER PUBLICATIONS

Microsoft Computer Dictionary, 2002, Microsoft Press, Fifth Edition, 336.*

(Continued)

*Primary Examiner*—Tadesse Hailu
*Assistant Examiner*—Nicholas S Ulrich
(74) *Attorney, Agent, or Firm*—Townsend and Townsend and Crew LLP

(57) ABSTRACT

Described herein is a collaborative and Web-based whiteboarding tool for creating, collecting, storing, managing and performing searches on graphical customer information and information related thereto. When implementing the present invention, the company retains possession of and control over the sales-related diagrams generated by its sales force. Participants in a collaborative Web session are provided with one or more palettes of diagram primitives, which reduce the whiteboarding (diagram) task to an easily mastered series of object drag-and-drops, line connections, and text blurbs. The diagrams, as well as the diagram primitives (including, for example, icons, diagrams and portions thereof) are stored in a selectably accessible database. In addition, the diagram primitives may have fully searchable information associated therewith, in the form of metadata or tags, for example.

16 Claims, 3 Drawing Sheets

U.S. PATENT DOCUMENTS

| | | | |
|---|---|---|---|
| 6,611,822 B1 | 8/2003 | Beams et al. | |
| 6,704,294 B1 | 3/2004 | Cruickshank | |
| 6,901,448 B2 * | 5/2005 | Zhu et al. | 709/228 |
| 6,930,673 B2 | 8/2005 | Kaye et al. | |
| 6,976,220 B1 | 12/2005 | Lapstun et al. | |
| 6,988,138 B1 * | 1/2006 | Alcorn et al. | 709/225 |
| 7,010,752 B2 | 3/2006 | Ly | |
| 7,043,529 B1 | 5/2006 | Simonoff | |
| 7,047,279 B1 | 5/2006 | Beams et al. | |
| 2002/0010721 A1 * | 1/2002 | Crimmins et al. | 707/527 |
| 2003/0077561 A1 * | 4/2003 | Alsop et al. | 434/408 |
| 2003/0167339 A1 * | 9/2003 | Zhu et al. | 709/238 |
| 2004/0199617 A1 * | 10/2004 | Garrett et al. | 709/223 |

OTHER PUBLICATIONS

Jeff Bertolucci, CNET Reviews, "WebEx Meeting Center", http://reviews.cnet.com/WebEx_Meeting_Center/4514-3513_7-9755871.html, printed Oct. 25, 2006 (6pgs).

Oracle Collaboration Suite Quick Tutorial, "Oracle Web Conferencing", http://mmdb22.g.fh-nuernberg.de:7777/quicktutorial/html/components/web_conferencing..., printed Oct. 25, 2006 (3pgs).

Colin Smith, WebEx Press Release, "Virtual Ink and WebEx Team to Plug Real World Whiteboards into Web Meetings", Apr. 5, 2000, http://www.webex.com/pr/pr57.html, printed Oct. 25, 2006 (3pgs).

Michael Tonsing, The Federal Lawyer in Cyberia, "E-Meetings Are an Idea Whose Time Has Come", Sep. 2003 (3pgs).

* cited by examiner

METHODS AND SYSTEMS FOR COLLABORATIVE WHITEBOARDING AND CONTENT MANAGEMENT

This application claims the benefit under 35 U.S.C. §119 (e) of Provisional Patent Application Ser. No. 60/438,612, filed Jan. 8, 2003.

BACKGROUND OF THE INVENTION

1. Field of the Invention

The present invention relates generally to Web-based collaborative diagram creation, storage and management.

2. Description of the Prior Art and Related Information

Remote selling has matured over the past several years as vendors have sought out ways to "erase" the line and distance between vendor and customer. The key to success in this effort is to find ways to simulate face-to-face customer communication, or at least derive all of the benefits of face-to-face communication, without carrying over the drawbacks.

Whiteboards, or chalk talks, are very common in a sales situation, as a great deal of the sales effort is geared towards customer education. Concepts, problems, business strategies, product solutions, configurations, are all common topics for chalk talk or whiteboarding sessions. For a remote sales force to be effective at selling, vendors must have the ability to conduct these activities remotely as effectively as they would in a face-to-face meeting.

Conventionally, sales representatives have utilized graphics programs such as Microsoft's PowerPoint application to generate diagrams representing, for example, the customer's current installed base, desired products or solution. Collaborative Web tools such as those offered by Webex® (for example) have been useful in that regard, and allow vendors and customers to simultaneously view the same diagram. However, graphics programs such as Microsoft's PowerPoint® are limited in their usefulness and programs such as VISIO®, although complete, are complex and present a steep learning curve. Moreover, such tools are not Web-enabled. Therefore, sales representatives have traditionally not used such applications as sales tools when conferencing with a customer or prospective customer over the Web. Where Visio® diagrams are used for business presentations over the Web and shared across a network, they have conventionally engendered massive stencil files that are awkward to store on the network and to download to the user's desktop. The alternative is to forego sharing the diagrams between sales representatives and to force sales representatives to regenerate very similar diagrams time after time. This also has the undesirable consequence of the sales representative's employer loosing control over the content created by its sales representatives. Indeed, it is common for some sales representatives to take their diagrams and generated content with them when they leave for another employer. This results in a steep learning curve for the new sales representative, who must regenerate the content him or herself by again interviewing the customer to again ascertain their current needs and installed base of products.

What are needed, therefore, are methods and systems for cooperatively developing diagrams with a customer or a prospective customer that are easy to use and to maintain. What are also needed are methods and systems for centrally storing, managing and maintaining control over the content (such as graphics files) generated by the sales representatives and their customers.

SUMMARY OF THE INVENTION

According to an embodiment thereof, the present invention is a computer implemented method of conducting a collaborative web-based whiteboarding session, comprising the steps of establishing a selectively accessible web page defining a whiteboard area and a palette area, the palette area including a plurality of selectable palettes, each of the palettes including representations of a plurality of predefined diagram primitives that are each configured to be selected, dragged and dropped from the palette area into the whiteboard area by users having accessed the web page, each of the drawing primitives including an information tag associated therewith; enabling a sales representative and a customer to separately or simultaneously access the established web page; collaboratively creating a diagram by the sales representative and/or the customer selecting diagram primitives from the palette area dragging and dropping the selected diagram primitives into the whiteboard area; storing the created diagram in a selectively accessible database controlled by an employer of the sales representative, and associating the information tags of the selected diagram primitives with the created diagram and storing the associated information tags in the database.

The method may further include a step of retrieving a diagram stored in the database by carrying out a search of the information tags stored in the database. A step of the sales representative and the customer carrying out a voice conversation during the collaborative diagram creating step may also be carried out. The activities of the customer on the selectively accessible web page may be logged. The logging step may log which drawing primitives the customer has selected for inclusion in the created diagram. The logging step may log the time the customer spends on the selectively accessible web page. The logging step may log any diagram created by the customer. The storing step may store the created diagram in such a manner that neither the customer nor the sales representative may delete the created drawing without permission from the employer of the sales representative.

The present invention, according to another embodiment thereof, is a software application configured to enable a sales representative at a first computer and a customer at a second computer to collaboratively create and edit a diagram over a network linking the first and second computers, and comprising, stored on a computer-readable medium: code configured to establish a selectively accessible web page defining a whiteboard area and a palette area, the palette area including a plurality of selectable palettes, each of the palettes including representations of a plurality of predefined diagram primitives that are each configured to be selected, dragged and dropped from the palette area into the whiteboard area by users having accessed the web page, each of the drawing primitives including an information tag associated therewith; code configured to enable the sales representative and the customer to separately or simultaneously access the established web page; code configured to enable a collaborative creation of a diagram by the sales representative and/or the customer selecting diagram primitives from the palette area dragging and dropping the selected diagram primitives into the whiteboard area; code configured to store the created diagram in a selectively accessible database controlled by an employer of the sales representative, and code configured to associate the information tags of the selected diagram primitives with the created diagram and to store the associated information tags in the database.

BRIEF DESCRIPTION OF THE DIAGRAMS

DETAILED DESCRIPTION

The present invention provides a uniform framework for collecting, storing, managing and performing searches on graphical customer information and information related thereto. When implementing embodiments of the present invention, the company retains possession of and control over the information generated by its sales force, even after they depart for another employer.

Embodiments of the present invention include providing the participants in the collaborative Web session with one or more palettes (e.g., collections) of diagram primitives and reducing the whiteboarding (diagram) task to a series of object drag-and-drops, line connections, and text blurbs, all of which are easy operations to master with a mouse (or other pointing device) and keyboard. The diagrams, as well as the diagram primitives (including, for example, icons, diagrams and portions thereof) may be stored in a selectably accessible database. In addition, the diagram primitives may have information associated therewith, which information may be in the form of metadata or tags, for example. Such metadata may also be stored in the database and may be selectably accessible to those on the network having appropriate permissions. The metadata or tags may also be searched using, for example, queries formulated in PL/SQL. The metadata may include information relative to the diagram primitive, the diagram, the particular object, item or action illustrated, the industry to which the thing illustrated belongs, and/or any other information that may be useful in characterizing the thing or process illustrated.

The present whiteboarding tool may be utilized by sales representatives and sales consultants (for example) together with customers or potential customers and anyone who wants to display, build and/or maintain diagrams. Such users may pull up, display and/or edit predefined diagrams, or may build diagrams from scratch, store and share them with selected others. Users may be categorized, for example, according to permissions granted to them. For example, one or more users may be designated as having an administrator role and granted administrative privileges, enabling them to create, delete or maintain palettes, and can add or delete items within a palette, for example.

Figure 1:
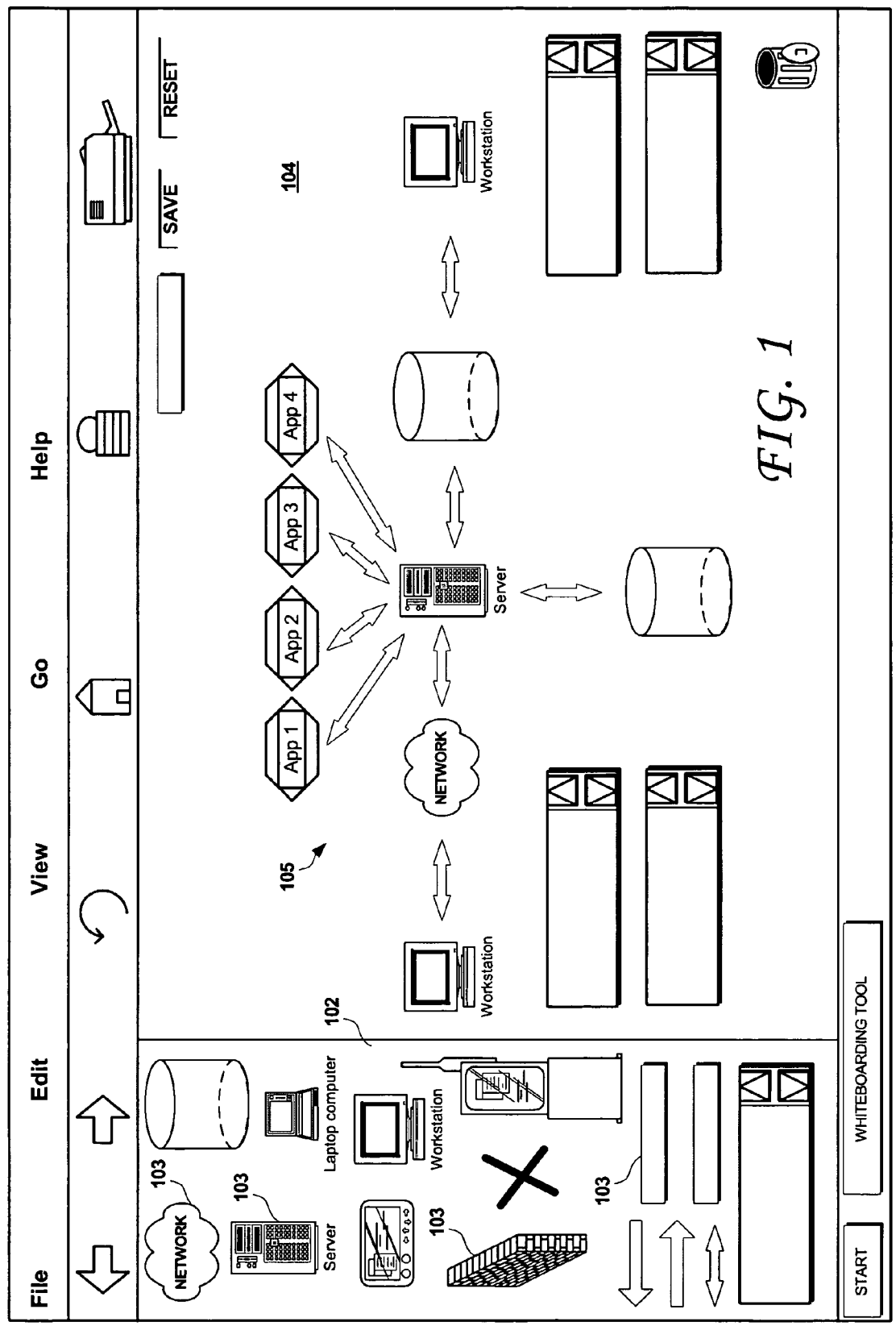
FIG. 1 is a representation of collaborative diagramming (also called whiteboarding) tool according to an embodiment of the present invention.

FIG. 1 is a representation of collaborative diagramming (also called whiteboarding) tool according to an embodiment of the present invention. As shown, a web browser 100 displays for both the customer(s) and the sales representative (for example) an active window that includes a palette 102 including a plurality of diagram primitives 103 (in the exemplary palette shown, the diagram primitives 103 include representations of a network, a database, a server, a laptop computer, a PDA, a workstation, a firewall, an "X", a network-enabled mobile telephone, arrows and text fields) and a whiteboard area 104 in which either sales representative or the customer(s) may drag, drop and interconnect the diagram primitives. Embodiments of the present invention also allow free form diagram—that is, diagrams that are created using the user's pointing device without using the diagram primitives within the palette 102. Free for text entry may also be enabled. By free form diagram, free form text entry, and/or dragging and dropping such diagram primitives and connecting them using the provided connector primitives (e.g., arrows), the sales representative and the customer(s) may together sketch out the customer's current installation and/or a proposed solution to the customer's needs, optionally while talking to each other over a voice communication channel (e.g., telephone, Voice over IP channel). The present whiteboarding tool may be accessed by the customer independently of the sales representative or by the sales representative independently of the customer. Advantageously, however, the present whiteboarding tool may be accessed simultaneously by both the customer(s) and the sales representative over a (preferably secure) communication channel (such as a Secure Socket Layer SSL, for example). Concurrently, both the customer and the sales representative may converse over the telephone or a videoconference, to discuss the customer's requirements while collaboratively creating a diagram (such as the illustrative diagram 105 shown in FIG. 1) representing a potential solution to these customer requirements.

Palettes may be organized into one or more lists or categories. Some lists may be pre-seeded while others may be created by users. All lists may be edited by the users. Representative lists may include, for example:

Hardware: including diagram primitives representing servers, client machines, networks and firewall, for example;

Software: including diagram primitives representing program bubbles, client, server, daemon, report bubbles, code layer rectangles and networks, for example;

Functional: including business flow diagrams diagram primitives for example;

Other lists of industry-specific diagram primitives may be included and/or developed. Other diagram primitives may include rubber-banding lines and arrows, text boxes to add textual annotations to diagram primitives, as well as descriptive tags, which may include metadata or other information relating to the diagram or diagram primitive. Additional information regarding a diagram primitive may also be included. Metadata annotations may be created for graphical icons and/or other diagram portions. Each of the diagram primitives may also include a memo field. The user may change the size or other attributes of the diagram primitives by right clicking on the diagram primitives within the whiteboard area 104 or within the palette 102.

Embodiments of the present invention may also include functionality to enable users to read in a diagram into a current diagram in an additive fashion. The users may also be given the ability to switch palettes mid-diagram. Diagrams created with the instant whiteboarding tool are not limited or categorized by a single palette. Therefore, a single diagram may include diagram primitives drawn from any number of palettes. A palette may be designated as a default palette.

A number of diagram management functions are included in the present diagramming (whiteboarding) tool. For example, users may be given (depending upon the user's permission or privilege level) the ability to save and retrieve diagrams, the ability to "publish" diagrams for global use or selective use and access (generally to control the access to), as well as the ability to categorize a diagram along the following exemplary dimensions: industry, product area, customer, sales group and measurement & reporting functions, for example.

The present whiteboarding tool may be configured to log usage information regarding users, diagrams and/or diagram primitives, for example. By virtue of this logging feature, users (given appropriate permission levels) may view diagram and widget/palette usage, may view usage by user or sales group and/or may view usage by diagram category. Diagrams created using the present whiteboarding tool may be saved for use by other programs, saved and sent to a proposal builder and/or saved as a file for use anywhere. According to other embodiments, a "reader" may allow client applications to display complete diagrams, which may then allow the user to click anywhere on the diagram to enter the whiteboard tool, and edit/save from there.

According to other embodiments of the present invention, the present whiteboarding tool may provide and users may access information relating to the number of diagrams built to date and information relating to the usage of diagrams. Users may also access lists relating to, for example, the last N diagrams accessed by a selected user or users, the N most popular diagrams or the N oldest and least used diagrams. From this information, a sales person or organization may gain valuable insight into his or her client's current interests and the level of that interest. Other usage metrics may be included and accessible to the salesperson user.

According to further embodiments, the present whiteboarding tool may provide the ability to search for diagrams through the use of search parameters matching the metadata or tags of the constituent diagram primitives of the diagrams, for example. Other search parameters may be used for such searches. For example, previously created (or partially completed) diagrams may be searched and/or browsed through the use of diagram menus showing industry-specific lists of diagrams and/or product category lists of diagrams, to list but a few of the possibilities. The user may then click on a list element to retrieve diagrams under that category. The present whiteboarding tool may be configured to create a new diagram by choosing a palette, may be configured to edit an existing diagram, read an existing diagram into a current edit workspace, to save a diagram, to categorize a diagram (as corresponding to a specific industry, for example), to save a diagram, and to make a diagram selectively publicly accessible. Diagrams may also be exported for use by other applications. User may also change their personal settings.

Those users having administrative-level roles and privileges (the salesperson's supervisor, for example) may be granted all of the user rights described above, in addition to other diagram management rights appropriate to their position within the company's sales force hierarchy. For example, such users may view the N most popular palettes or N most popular diagram primitive within a given palette. Lists of palettes may be viewed and maintain, as may be the diagram primitives within a given palette.

Figure 2:
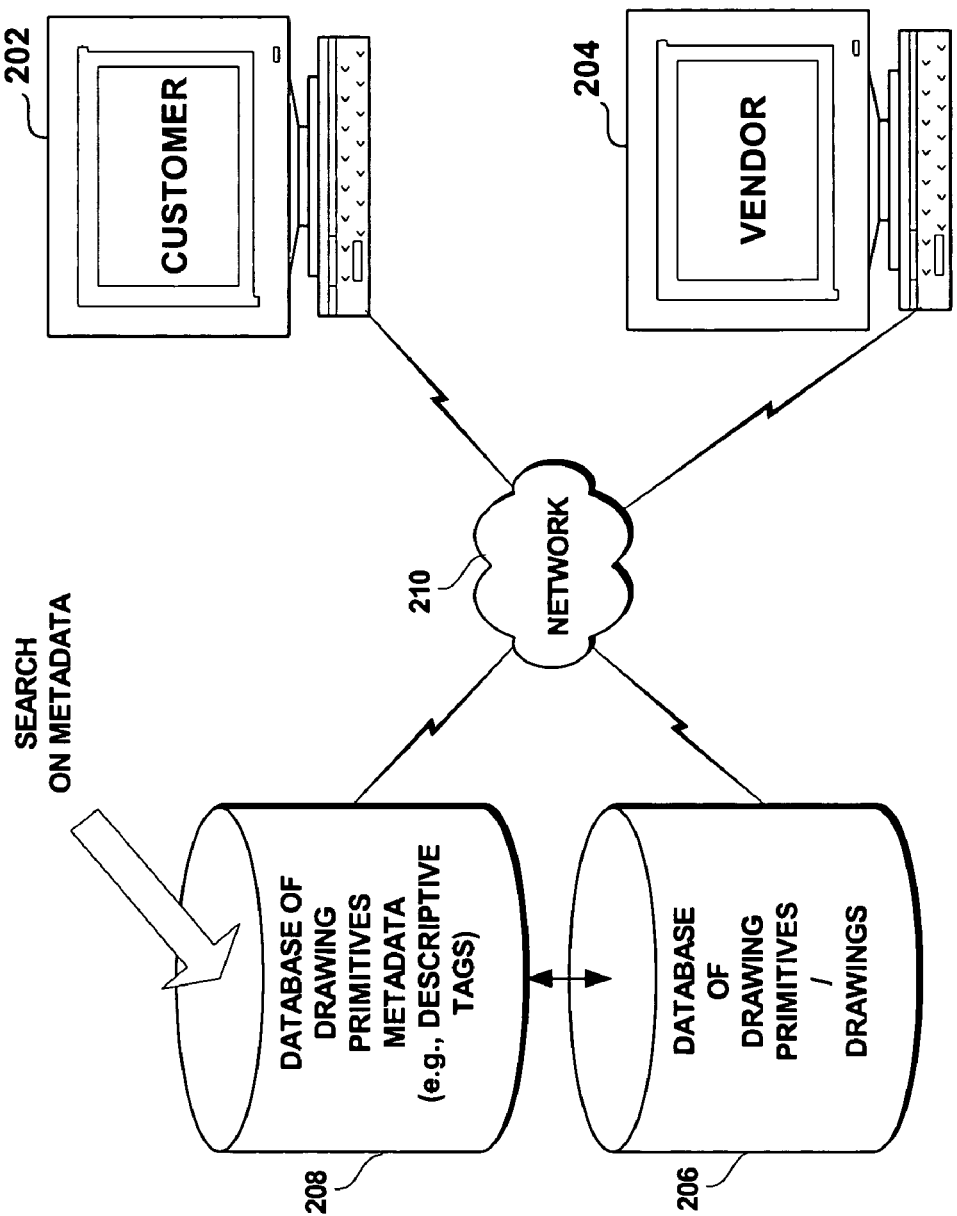
FIG. 2 is a block diagram illustrating an embodiment of a system for collaborative whiteboarding according to an embodiment of the present invention.

FIG. 2 is a block diagram illustrating an embodiment of a system for collaborative whiteboarding according to an embodiment of the present invention. As shown, a customer 202 and a vendor 204 (collectively, users) are coupled to a computer network 210 including, for example, the Internet. Also coupled to the network 210 is a database 206 of diagram primitives and/or diagrams, of the type illustrated in FIG. 1. The database 206 is selectably accessible by one or more sales representatives of the vendor 204. The database 206 may be configured to store the diagrams created by the sales representative or collaboratively created by the sales representative and the customer 202. The vendor maintains control over the database 206, and thus of the content created by its sales representatives and/or the customer 202 during the whiteboarding sessions. A database 208 may also be selectably accessible by the sales representatives and/or others, and may contain information related to the diagram primitives and diagrams stored in the database 206. The database 208 may be a part of the database 206. For example, the database 208 may be embodied as tables within the database 208. The database 208 may include metadata relating to the diagram primitives and/or diagrams stored in the database 206, thereby enabling sales representatives to search on this metadata and to derive useful information therefrom. For example, the metadata may detail information such as the industry, product area, customer or sales group to which the diagram primitive or diagram is related. This enables re-use of diagram primitives and diagrams so as to reduce the duplication of diagrams and solutions worked out by sales representatives. Querying on the metadata also allows the vendor 202 to gather additional individual or aggregate information regarding its customers. Centrally storing the diagrams allows any salesperson to retrieve existing diagrams, to change the retrieved diagrams at will and to stored the changed diagrams back into the database(s) 206, 208, thereby rendering it accessible to all or to selected persons.

The present invention, however, need not be solely used in collaborative fashion—that is, with both the customer and the sales representative accessing and viewing the same diagram at the same time over the computer network (e.g., the Web). Indeed, as the present invention is database and Web-enabled, the customer and the sales representative may each independently return to the diagram and update it or modify it. The customer, in this case, would be given an appropriate URL and a password that would enable him or her to return to the diagram(s). This enables the sales process to proceed at a faster rate and the sales representative can see the changes that the customer wants without engaging in a formal and pre-arranged collaborative session and without exchanging synchronizing PowerPoint® or VISIO® presentations (for example).

According to another embodiment thereof, the present invention may also include complete auditing and tracking functionality to enable full tracking, auditing and logging of the salesperson's and/or the customer's use of the whiteboarding tool. In this manner, the sales representative may ascertain whether the customer is using the tool to further the sales process (by refining his or her diagram(s) or current needs or existing install base, for example) or using the present whiteboarding tool for other, unrelated purposes. The auditing functionality may, for example, track the customer's time spent using the present whiteboarding tool, which diagrams the customer may have created, modified or deleted or which icons the customer has created, modified or deleted, among other auditing and tracking possibilities.

The database(s) 206, 208 may advantageously be tied to the vendor's Customer Relationship Management (CRM) software applications, to augment the functionality of such applications.

The present invention may also advantageously be used in combination with the inventions described and shown in copending and commonly assigned U.S. application Ser. No. 10/755,162 entitled "Methods and Systems for Sales Territory Whitespacing" the disclosure of which is hereby incorporated herewith in its entirety. For example, by creating a diagram of the customer's existing installed base of products or services, the present invention may be enabled to populate one or more whitespaces in the territory whitespace tool described in the above referenced application.

Figure 3:
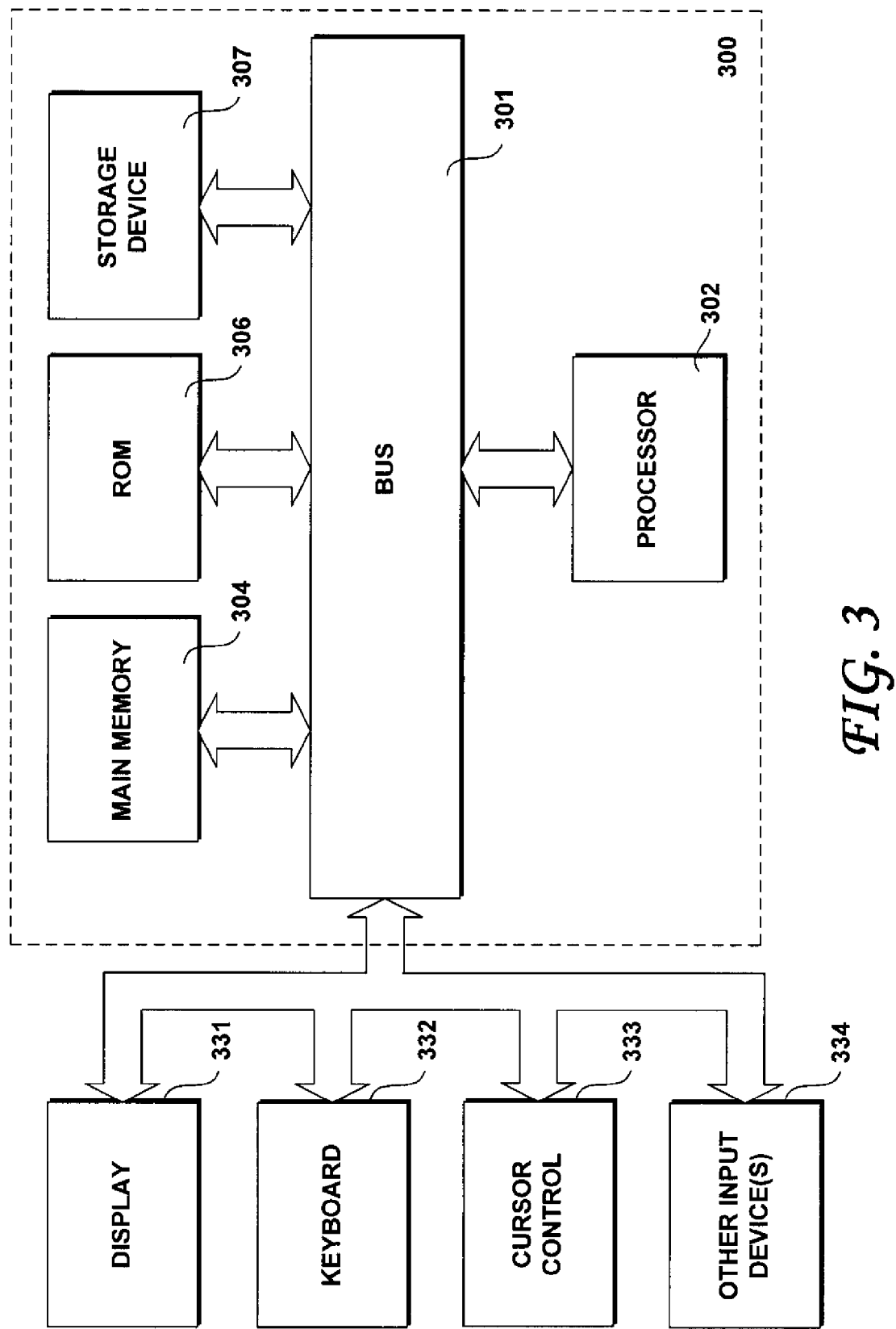
FIG. 3 is a block diagram of a computing device with which the methods of the present invention may be implemented.

FIG. 3 illustrates a block diagram of a computing device 300 with which an embodiment of the present invention may be implemented. Computing device 300 includes a bus 301 or other communication mechanism for communicating information, and a processor 302 coupled with bus 301 for processing information. Computing device 300 further comprises a random access memory (RAM) or other dynamic storage device 304 (referred to as main memory), coupled to a bus 301 for storing information and instructions to be executed by processor 302. Main memory 304 also may be used for storing temporary variables or other intermediate information during execution of instructions by processor 302. Computing device 300 may also include a read only memory (ROM) and/or other static storage device 306 coupled to bus 301 for storing static information and instructions for processor 302. A data storage device 307, such as a magnetic disk or optical disk, may be coupled to bus 301 for storing information and instructions. A communication device 308, such as a modem or network (such as Ethernet, for example) card is also coupled to the bus 301 to provide access to a network, such as shown at 210 in FIG. 2.

The computing device 300 may also be coupled via bus 301 to a display device 321 for displaying information to a computer user. An alphanumeric input device 322, including alphanumeric and other keys, is typically coupled to bus 301 for communicating information and command selections to processor 302. Another type of user input device might be user's own voice or cursor control 323, such as a mouse, a trackball, or cursor direction keys for communicating direction information and command selections to processor 302 and for controlling cursor movement on display 321.

The present invention is related to the use of computing device 300 to enable the collaborative whiteboarding and content management described and shown herein. According to one embodiment, the sharing is carried out by one or more computing devices 300 in response to processor(s) 302 executing sequences of instructions contained in memory 304. Such instructions may be read into memory 304 from another computer-readable medium, such as data storage device 307 and/or from a remotely located server. Execution of the sequences of instructions contained in memory 304 causes processor(s) 302 to implement the functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer implemented method of conducting a collaborative web-based whiteboarding session, the method comprising:

establishing a selectively accessible web page defining a whiteboard area and a palette area at a set of one or more computer systems controlled by an employer of sales representatives, the palette area including a plurality of selectable palettes, each of the palettes including representations of a plurality of predefined diagram primitives that are each configured to be selected, dragged and dropped from the palette area into the whiteboard area by users having accessed the web page, each of the drawing primitives including metadata associated therewith stored in a first database accessible to the set of one or more computer systems, the metadata including:
at least a description of the diagram primitive, and
an industry to which the diagram primitive is associated;
enabling, at the set of one or more computer systems, a sales representative and a customer to separately or simultaneously access the established web page;
receiving, at the set of one or more computer systems, information from the sales representative and the customer collaboratively creating a diagram by selecting diagram primitives from the palette area dragging and dropping the selected diagram primitives into the whiteboard area;
storing the created diagram in a selectively accessible database accessible to the set of one or more computer systems and controlled by the employer of the sales representative;
logging, with the set of one or more computer system, an activity of the customer and of the sales representative in the whiteboard area and logging, with the set of one or more computer system, which diagram primitives were selected by the customer and by the sales representative for inclusion in the created diagram;
associating, with the set of one or more computer system, the metadata of the selected diagram primitives stored in the first database, the logged activity and the logged diagram primitives with the created diagram and storing the associated metadata, the logged activity and the logged diagram primitives in the selectively accessible database controlled by the employer of the sales representative;
searching, with the set of one or more computer system, at least the stored associated metadata in the selectively accessible database controlled by the employer of the sales representative to derive industry, product and/or customer information and to derive information regarding the created diagram in response to information provided by another sales representative of the employer;
determining, with the set of one or more computer system, a potential solution for customers of the another sales representative using the created diagram and the derived information; and
generating information about the potential solution for at least one customer of the another sales representative using the set of one or more computer system.

2. The computer-implemented method of claim 1, further comprising a step of retrieving a diagram stored in the database by carrying out a search of the metadata stored in the database.

3. The computer-implemented method of claim 2, wherein the step of carrying out the search includes at least one of searching and browsing through menus showing at least one of industry-specific lists of diagrams, product category lists of diagrams and customer-created diagrams using the stored metadata associated with the diagram primitives of the created diagrams.

4. The computer-implemented method of claim 1, further comprising a step of the sales representative and the customer carrying out a voice conversation during the collaborative diagram creating step.

5. The computer-implemented method of claim 1, wherein the logging step logs a time the customer spends on the selectively accessible web page.

6. The computer-implemented method of claim 1, wherein the logging step logs any diagram created by the customer.

7. The computer-implemented method of claim 1, wherein the storing step stores the created diagram in such a manner that neither the customer nor the sales representative may delete the created diagram without permission from the employer of the sales representative.

8. The computer-implemented method of claim 1, wherein the customer activity logging step includes maintaining lists detailing a last N diagrams accessed by each customer.

9. A software application configured to enable a sales representative at a first computer and a customer at a second computer to collaboratively create and edit a diagram over a network linking the first and second computers, and comprising, stored on a computer-readable medium:

code configured to establish a selectively accessible web page defining a whiteboard area and a palette area, the palette area including a plurality of selectable palettes, each of the palettes including representations of a plurality of predefined diagram primitives that are each configured to be selected, dragged and dropped from the palette area into the whiteboard area by users having accessed the web page, each of the diagram primitives including metadata associated therewith stored in a first database, the metadata including:

at least a description of the diagram primitive, and an industry to which the diagram primitive is associated;

code configured to enable the sales representative and the customer to separately or simultaneously access the established web page;

code configured to enable a collaborative creation of a diagram by the sales representative and/or the customer selecting diagram primitives from the palette area dragging and dropping the selected diagram primitives into the whiteboard area;

code configured to store the created diagram in a selectively accessible database controlled by an employer of the sales representative;

code configured to log an activity of the customer and of the sales representative in the whiteboard area and to log which diagram primitives were selected by the customer and by the sales representative for inclusion in the created diagram;

code configured to associate the metadata of the selected diagram primitives stored in the first database, the logged activity and the logged diagram primitives with the created diagram and to store the associated metadata, the logged activity and the logged diagram primitives in the selectively accessible database controlled by the employer of the sales representative;

code configured to enable searching at least the stored associated metadata in the selectively accessible database controlled by the employer of the sales representative to derive industry, product and/or customer information regarding the created diagram in response to information provided by another sales representative of the employer;

code configured to determine a potential solution for customers of the another sales representative using the created diagram and the derived Information; and code for generating information about the potential solution for at least one customer of the another sales representative.

10. The software application of claim 9, further comprising code configured to retrieving a diagram stored in the database by carrying out a search on the metadata stored in the database.

11. The software application of claim 9, further comprising code configured to enable the sales representative and the customer to carry out a voice conversation during the collaborative diagram creating step.

12. The software application of claim 9, wherein the activity logging code is configured to log a time the customer spends on the selectively accessible web page.

13. The software application of claim 9, wherein the activity logging code is configured to log any diagram created by the customer.

14. The software application of claim 9, wherein the diagram storing code is configured to store the created diagram in such a manner that neither the customer nor the sales representative may delete the created diagram without permission from the employer of the sales representative.

15. The application of claim 9, wherein the customer activity logging code includes code for maintaining lists detailing a last N diagrams accessed by each customer.

16. The application of claim 9, wherein the code configured to log the customer activity includes code for at least one of searching and browsing through menus showing at least one of industry-specific lists of diagrams, product category lists of diagrams and customer-created diagrams using the stored metadata associated with the diagram primitives of the created diagrams.

* * * * *

UNITED STATES PATENT AND TRADEMARK OFFICE
CERTIFICATE OF CORRECTION

PATENT NO. : 7,681,136 B2 Page 1 of 1
APPLICATION NO. : 10/755195
DATED : March 16, 2010
INVENTOR(S) : Norman Gennaro et al.

It is certified that error appears in the above-identified patent and that said Letters Patent is hereby corrected as shown below:

In column 7, line 67, in claim 1, delete "drawing" and insert -- diagram --, therefor.

Signed and Sealed this

Twenty-eighth Day of September, 2010

David J. Kappos
*Director of the United States Patent and Trademark Office*